US00RE35307E

United States Patent [19]

Nemedi

[11] E Patent Number: Re. 35,307

[45] Reissued Date of Patent: Jul. 30, 1996

[54] CHIP WRINGER BOWL/BLADE IMPROVEMENT

[75] Inventor: William D. Nemedi, Vicksburg, Mich.

[73] Assignee: Inter-Source Recovery Systems, Inc., Kalamazoo, Mich.

[21] Appl. No.: 190,800

[22] Filed: Feb. 2, 1994

Related U.S. Patent Documents

Reissue of:

[64] Patent No.: 4,936,822
Issued: Jun. 26, 1990
Appl. No.: 355,649
Filed: May 22, 1989

[51] Int. Cl.[6] ..... B04B 1/04

[52] U.S. Cl. ..... 494/43; 210/373; 210/512.1; 494/74

[58] Field of Search ..... 494/43, 58, 59, 494/67, 74; 210/373, 512.1, 372, 781, 782

[56] References Cited

U.S. PATENT DOCUMENTS

| | | | |
|---|---|---|---|
| 695,158 | 3/1902 | Lafferty . | |
| 1,362,973 | 12/1920 | Vardell . | |
| 1,520,467 | 12/1924 | Frantz . | |
| 2,312,545 | 3/1943 | Haug | 210/373 |
| 2,435,665 | 1/1948 | Woolaver | 494/74 |
| 2,748,668 | 6/1956 | Hornbostel | 494/74 |
| 3,012,710 | 12/1961 | Steinacker | 233/41 |
| 3,216,042 | 11/1965 | Strittmatter | 15/246.5 |
| 3,366,318 | 1/1968 | Steimel | 233/5 |
| 3,519,136 | 7/1970 | Lega et al. | 210/374 |
| 3,850,814 | 11/1974 | Dudley | 210/298 |
| 4,082,675 | 4/1978 | Heckman | 210/360 |
| 4,137,176 | 1/1979 | Dudley et al. | 210/375 |
| 4,186,096 | 1/1980 | Areaux et al. | 210/377 |
| 4,186,097 | 1/1980 | Dudley et al. | 210/377 |
| 4,253,960 | 3/1981 | Dudley et al. | 210/373 |
| 4,298,476 | 11/1981 | Dudley | 210/373 |
| 4,310,417 | 1/1982 | Dudley et al. | 210/375 |

FOREIGN PATENT DOCUMENTS

| | | |
|---|---|---|
| 896863 | 5/1962 | United Kingdom . |

OTHER PUBLICATIONS

Drawing—Titan Systems, Kalamazoo, Michigan (Division French Systems, Inc.) labelled "Centrifuge Assembly" and having a date appearing to be Mar. 19, 1987.

Photograph—Titan System illustrated in drawing of Exhibit A. (No Date).

Photograph—Titan System illustrated in drawing of Exhibit A bearing date legend of Mar. 29, 1985.

Photograph—Titan System illustrated in Exhibit A. (No Date).

Photograph—Titan System illustrated in Exhibit A. (No Date).

Drawing—Titan Div./French Systems, Inc. labelled "T1-30 Centrifuge Assy"; dated Jan. 2, 1985; Drawing No. 1001-DA.

Drawing—Titan Systems labelled "T1-30 Sect Thru Bowl"; dated Jan. 6, 1985; Drawing No. 1002-DA.

Drawing—Titan Systems, Kalamazoo, Michigan (Division French Systems, Inc.) labelled "Vanes-Clamp Plate T1-42"; dated Apr. 2, 1987; Drawing No. 1185-D.

*Primary Examiner*—Robert W. Jenkins
*Attorney, Agent, or Firm*—Marshall, O'Toole, Gerstein, Murray & Borun

[57] ABSTRACT

A separator bowl and blade assembly for a centrifugal separator device in which a rotatable separator bowl has a plurality of recesses therein and a blade assembly or blank is adapted to be releasably disposed in the recesses. The blade assembly includes a pad having a structural configuration which corresponds and mates with the bowl recess. A blade extends outwardly from the pad and is connected to a bottom pad portion and an outwardly extending pad portion with the blade assembly being either an integral or releasably connected assembly.

54 Claims, 5 Drawing Sheets

64'
60
64
68
61
63
66
62
68
68
67
68
65
32
30
26
70
71
20
71
25
24
70
22

80
88
86
88
88
87
32
30
26
25
71
20
71
70
24
70
22

CHIP WRINGER BOWL/BLADE IMPROVEMENT

Matter enclosed in heavy brackets [ ] appears in the original patent but forms no part of this reissue specification; matter printed in italics indicates the additions made by reissue.

FIELD OF INVENTION

The invention relates generally to a centrifugal parts separator for separating lubricating and other fluids from metal or other scrap materials, and more particularly to a bowl and blade means assembly utilized in the centrifugal parts separator in which blade assemblies are releasably secured in recesses located on the internal separator bowl wall whereupon normal blade wear, the worn blade assembly comprising a blade and wear pad are removed from a recess in the separator wall and another blade assembly is fastened in place in the vacated recess.

BACKGROUND OF THE INVENTION

Centrifuge systems for continuously feeding and removing liquid from metal chips or other material impregnated with lubricating or other fluids are known in the prior art. Such systems are illustrated, for example, in Dudley U.S. Pat. No. 4,137,176 and Areaux U.S. Pat. No. 4,186,096. In these systems, the centrifuge includes a plurality of blades attached to the bottom wall of a rotatable separator bowl disposed inside the centrifugal parts separator unit. The blades are secured to a bowl liner which is a metal plate which lines the bottom wall of the separator bowl. The blades extend upward from the bottom wall along the vertical internal separator bowl wall. The liner protects the bowl bottom wall surface against wear. The blades are not connected to the internal vertical bowl wall but rather are fastened, generally by welding, to the liner on the bottom wall of the bowl.

It has been found that over a period of time, accumulated wear often occurs at the intersection of the leading surface of a blade and the internal vertical bowl wall as metal scraps contact the blades and bowl during normal operation of the parts separator. The surface of the bowl and blades are worn away over a period of time, thus adversely affecting the life of the bowl and blades disposed therein.

One method of overcoming this bowl and blade wear problem has been to index the blades along the bowl wall surface. As a particular portion of a bowl wall surface wears away, the liner with equally spaced blades secured thereto is rotated and indexed to a desired location whereupon the liner and blade assembly are refastened in position so that a blade will cover a worn area on the bowl. Unfortunately, bowl wear at the new location is regenerated after a period of time and the liner again has to be moved to a new location. As a result, after multiple indexing of the blade liner assembly, a separator bowl wears out and has to be replaced which is a time consuming and costly operation, particularly since such repairs often take place out in the field where a new separator bowl and a blade-liner assembly have to be shipped.

Additionally, the blades generally are secured to a bowl liner by welding such that as blades wear out, an entire liner having a plurality of blades thereon has to be removed from the bowl and replaced.

Another problem sometimes found with bowl and blade systems presently available is that the blades are attached solely to the plate liner located on the bottom of the bowl. The blades are not connected to the bowl along the outer or vertical blade edge located adjacent the internal vertical bowl wall. As a result, in some instances where particularly heavy scrap materials are centrifuged in the separator, blades will bend or otherwise become distorted. Bending of a blade can cause the blade and liner system to become unbalanced and unstable such that the system must be rebalanced for proper operation of the parts separator apparatus.

What is desired is a centrifugal separator apparatus which allows one or more worn blades in the separator bowl to be replaced as required independently of replacing other blades.

Additionally, it is desired to have a bowl-blade arrangement whereby the blades are securely connected along both the horizontal and outer vertical blade edges to provide a more secure fastening position and preclude blade distortion or bending.

It also is desired to have a bowl and blade arrangement whereby bowl wear need not be obviated by utilizing the indexing system presently employed.

It is also desired to be able to cast the bowl and/or blades, which has not been available heretofore due to the requirements of the indexing system utilized for obviating bowl wear problem.

Finally, it is desired to eliminate the need for utilizing a plate liner having a plurality of blades attached thereto.

SUMMARY OF THE INVENTION

The invention disclosed and claimed herein serves to overcome or otherwise obviate the above-described problems presently available with bowl and blade systems utilized in centrifugal parts separator devices presently available and to achieve the desires sought for a bowl-blade assembly used in a centrifugal parts separator device.

Briefly, the present invention utilizes a centrifugal separator bowl, which preferably is cast, with a plurality of recesses disposed in the internal vertical and bottom walls of the bowl. A plurality of blade assemblies are disposed in the various recesses, each blade assembly comprising a pad having a structural configuration which corresponds to the structural configuration of a bowl recess. A blade extends outwardly from the pad, the blade being connected to the pad along both the bottom blade edge and a substantial portion of the outer vertical blade edge. The blade and pad assembly can either be a one-piece integral cast metal unit or the pad and blade can be releasably secured to each other.

The inner pad surface, which is exposed to materials to be separated when the pad is installed in a bowl recess, is configured to blend or mate with the internal wall surface of the bowl. As a wear spot occurs at the intersection of a blade and pad, the blade-pad assembly is relatively readily and easily removed from a bowl recess and another blade-pad assembly is releasably fastened in the vacated bowl recess.

Additionally, the separator bowl can be utilized with different blade assembly arrangements. For example, in instances where only four blades are required for a particular centrifuge application as opposed to another application which requires eight blades, blank pads can be utilized in those bowl recesses which contain no blade assemblies.

The present invention allows both the blade-pad assemblies as well as the separator bowl to be cast which serves to reduce the cost of the bowl and blade assemblies.

DESCRIPTION OF THE DRAWINGS

Further advantages of the invention will become apparent upon a reading of the following detailed description taken in conjunction with the accompanying drawings in which.

DETAILED DESCRIPTION

Figure 1:
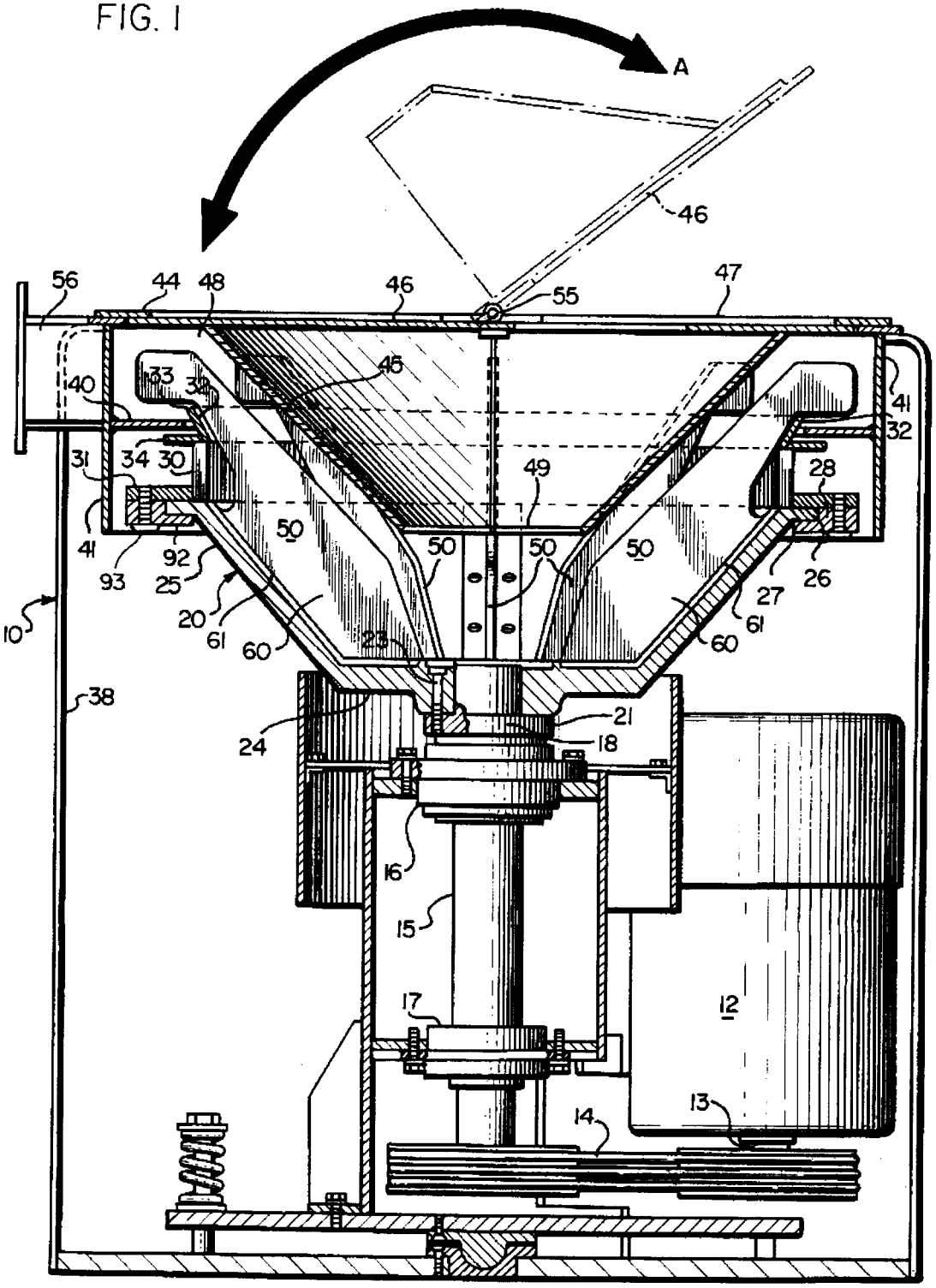
FIG. 1 is a front, partial section view of the separator device of the present invention and shows a plurality of blade assemblies disposed in recesses in a rotatable separator bowl.

Referring to the drawings and particularly FIG. 1, there is shown a centrifugal separator device 10 which includes motor 12 which has a drive shaft 13 connected by belt and pulley drive assembly 14 to one end of centrifugal separator drive shaft 15. Shaft 15 is disposed within two bearing assemblies 16, 17.

A hub 18 is fixedly disposed on the remaining end of drive shaft 15 and a substantially bell-shaped separator bowl 20 is seated on flange 21 of hub 18. Separator bowl 20 has an opening 22 (FIG. 2) which, when bowl 20 is seated on hub 18, provides a close fit between the bowl opening and hub 18. A plurality of bolts 23 serve to releasably fasten the bowl to hub 18 whereby, upon actuation of motor 12, bowl 20 connected to shaft 15, rotates.

Bottom wall 24 of separator bowl 20, which has inner and outer wall surfaces, extends outwardly and terminates in bowl wall 25 which extends vertically upwardly and outwardly with a mounting flange 26 located at end 27 of bowl wall 25. Bowl wall 25 also has an inner and outer wall surface.

A substantially cylindrical and porous separator screen 30, which is defined by a wire mesh or the like having openings therein to permit passage of lubricant or other fluids therethrough without permitting passage of shavings, chips or other materials, extends upward from flange 26 to permit discharge of lubricating liquid to be separated from the metal chips in the separator bowl. Screen 30 is secured to flange 26 by means of a plurality of fasteners 28.

A conical portion 32 is secured to the upper edge of screen 30 and extends radially outward in an upward direction to a dispensing edge 33.

A radially extending flange 34 is secured to the centrifugal separator bowl 20 intermediate the juncture between the conical portion 32 and screen 30.

Liquid discharged through the openings in screen 30 will be collected in a suitable collection chamber, not shown, preferably disposed within casing chamber 38 in which the parts separator device is disposed.

A radially, inwardly directed flange 40 is secured to cylindrical wall member 41 which depends from and is attached to the top of chamber 38 as seen in FIG. 1.

Cover 44 is fixed in any desired manner to the upper edge of chamber 38. In this particular embodiment, cover 44 includes an upper conical member 45 which is fixedly attached to and depends from cover 44. Conical member 45 comprises two pivotable cone-shaped portions 46, 47 whereby the outer wall of conical member 45 defines the inner wall of a second annular chip collecting chamber 48 and the cylindrical wall member 41 defines the outer wall thereof.

Cone 45 converges in a downward direction to a location spaced immediately above and within separator bowl 20. Opening 49 at the bowl end of conical member 45 defines an air inlet as well as a material inlet for shavings, chips or the like into centrifuge 10.

Spaced blade assemblies 50 are securely fastened to and rotate with rotatable separator bowl 20.

In a typical operation, metal chips and lubricating fluids are delivered to the top of centrifuge 10. The mixed chips and fluids enter centrifuge 10 and pass through conical member 45 which, as illustrated in FIG. 1, is in an open position with hinged cone portion 46 pivoted at 55, in the position located in the direction of arrow A.

The fluid mixed with the metal chips passes into rotating separator bowl 20 where the materials to be separated are forced outwardly and upwardly along the internal wall of bowl 20 and the leading surface of the blades 60. The lubricating fluid is separated from the chips and passes through screen 30 to a collection chamber (not shown) where the lubricating fluid is collected. The metal chips separated from the fluid are directed upward over screen 30, pass dispensing edge 33 and are blown out of chamber 48 and exit chute 56 on to a collecting site.

Figure 2:
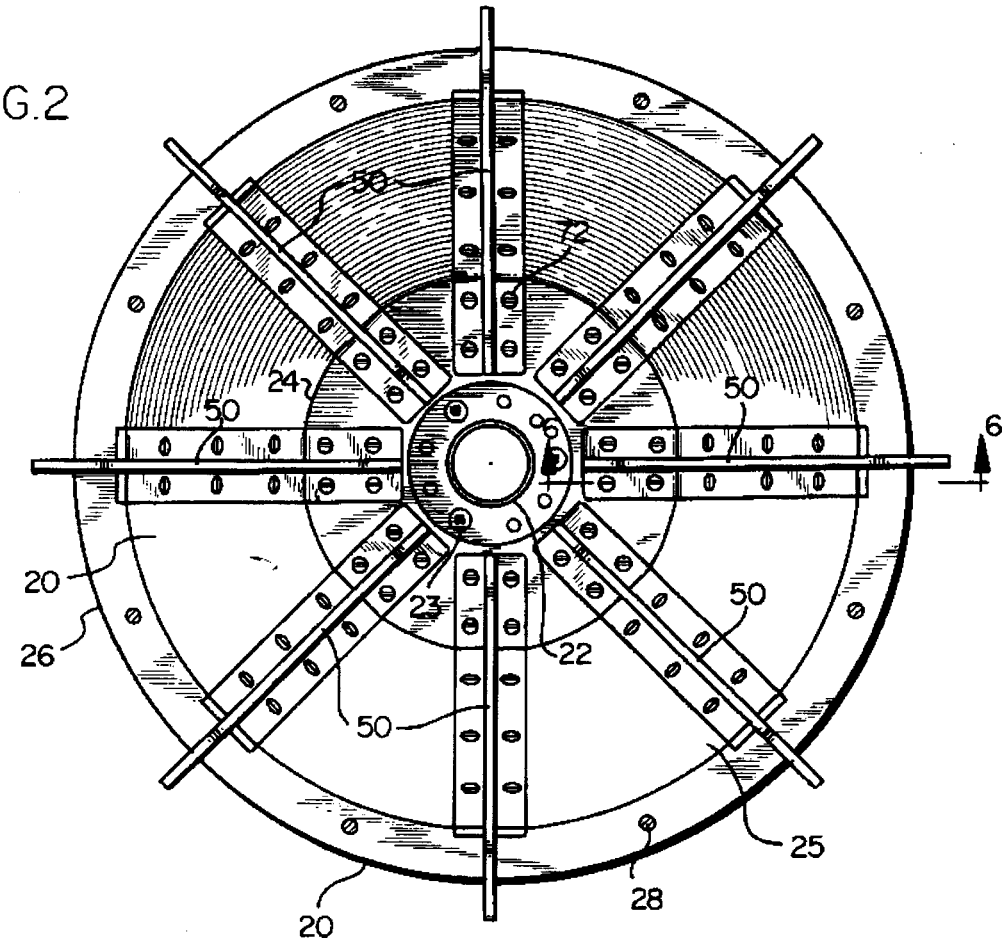
FIG. 2 is a top section view taken along lines 2—2 in FIG. 1 and shows eight blade assemblies of the present invention disposed in corresponding recesses in a rotatable separator bowl.
Figure 4:
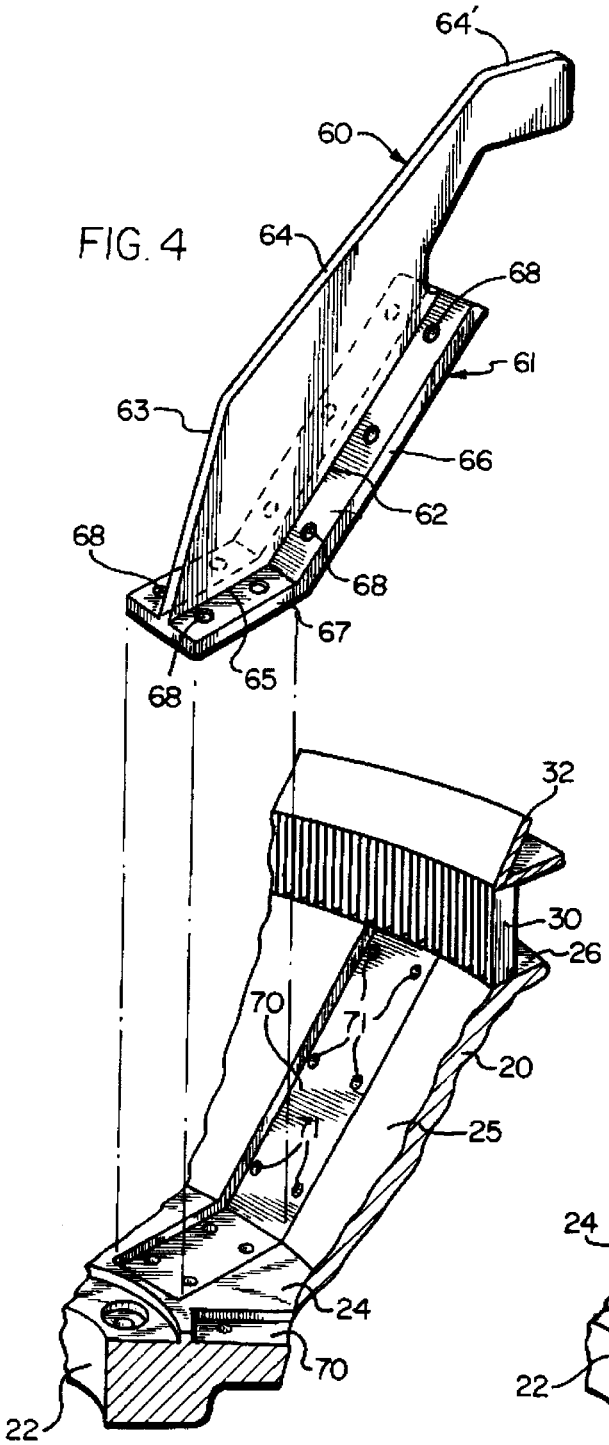
FIG. 4 shows a partial perspective view of a blade assembly comprising a blade and pad adapted to be inserted in a corresponding recess located in a separator bowl.

Referring to FIG. 2 and FIG. 4, separator bowl 20 is shown with eight blade assemblies 50 disposed within and releasably fixed to the bowl. Each blade assembly 50 includes a blade 60 and a pad 61. Blade 60 extends outward from pad 61 so that when assembly 50 is installed in bowl 20, blade 60 projects upward over screen 30 into chamber 48 as shown in FIG. 1. Blade 60 includes outer edge 62, inner edge 63, first top edge 64, second top edge 64' and bottom edge 65. As seen more clearly in FIG. 4, bottom blade edge 65 is fixed to bottom pad portion 67. Additionally, a substantial portion of outer edge 62, which is normally disposed within separator bowl 20, is fixed to inclined pad portion 66. Pad portions 66 and 67 form a structural configuration which is adapted to correspond and mate with the structural configuration of recess 70 located in separator bowl 20. For example, pad portions 66, 67 are each rectangular shaped and seat in the rectangular-shaped recess portions in bowl walls 24, 25. Other shapes could, of course, be utilized.

Figure 6:
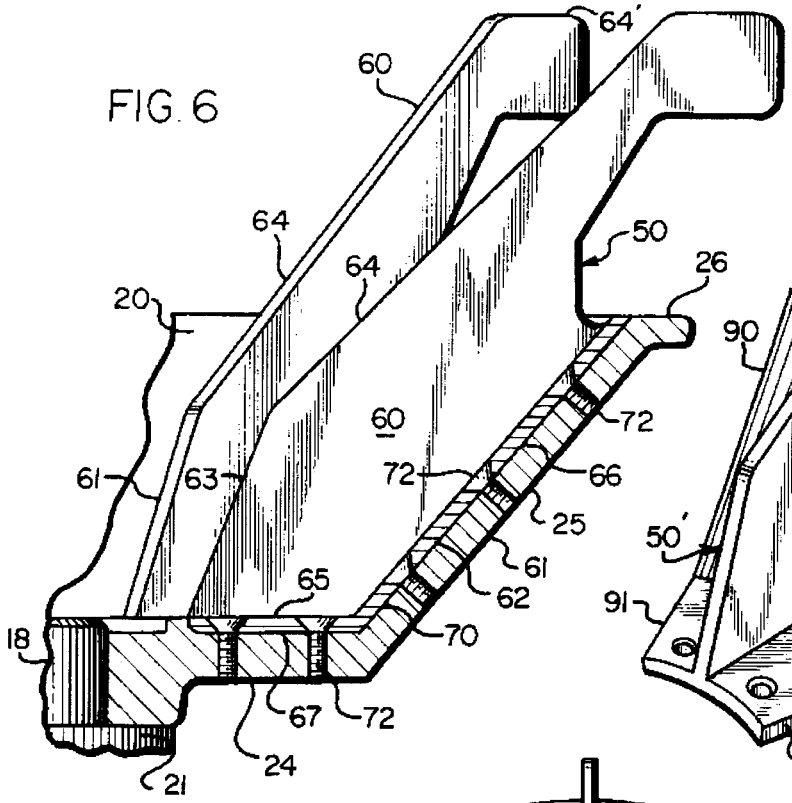
FIG. 6 is a section view taken along lines 6—6 in FIG. 2 and shows the blade assembly of the present invention releasably secured by fasteners in a recess located in the separator bowl.

As seen more clearly in FIG. 4, pad 61 has a plurality of openings 68 which are adapted to be aligned with threaded openings 71 in recess 70. Conventional fastening screws 72 (FIG. 6) are threaded into openings 71 whereby blade assembly 50 is securely fastened to the internal wall of separator bowl 20.

Normally, it has been found that the most extensive wear in separator centrifuge systems presently available occurs at the location of leading surface of blade edges 62 and 65 and pad portions 66, 67. When such wear occurs with the centrifuge of the present invention, one need only replace a particular worn blade assembly 50 as opposed to either indexing all the blades or completely replacing a blade-liner assembly. Replacement of a blade assembly of the present invention can be accomplished simply by withdrawing fastening screws 72, removing the worn blade assembly 50 and inserting a new blade assembly 50 in its place.

Figure 3:
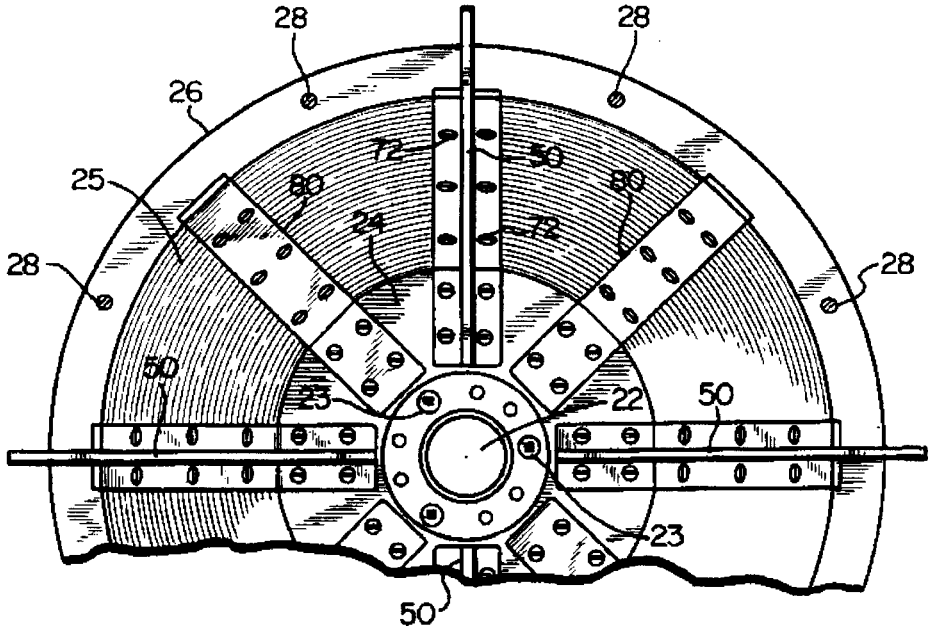
FIG. 3 shows the same view as FIG. 2 with the exception that four blade assemblies are disposed in four recesses in the separator bowl and four blanks are disposed in the four remaining separator bowl recesses.

Referring to FIGS. 2 and 3, it will be observed that the bowl-blade embodiment of FIG. 2 utilizes eight (8) blade assemblies 50. Referring to FIG. 3, the bowl-blade embodiment depicted therein utilizes only four (4) blade assemblies 50 even though separator bowl 20 is the same unit for the embodiments of FIG. 2 and FIG. 3. In the event it is not necessary to have a blade assembly in each bowl recess 70, a blank 80 may be placed in recess 70.

Figure 5:
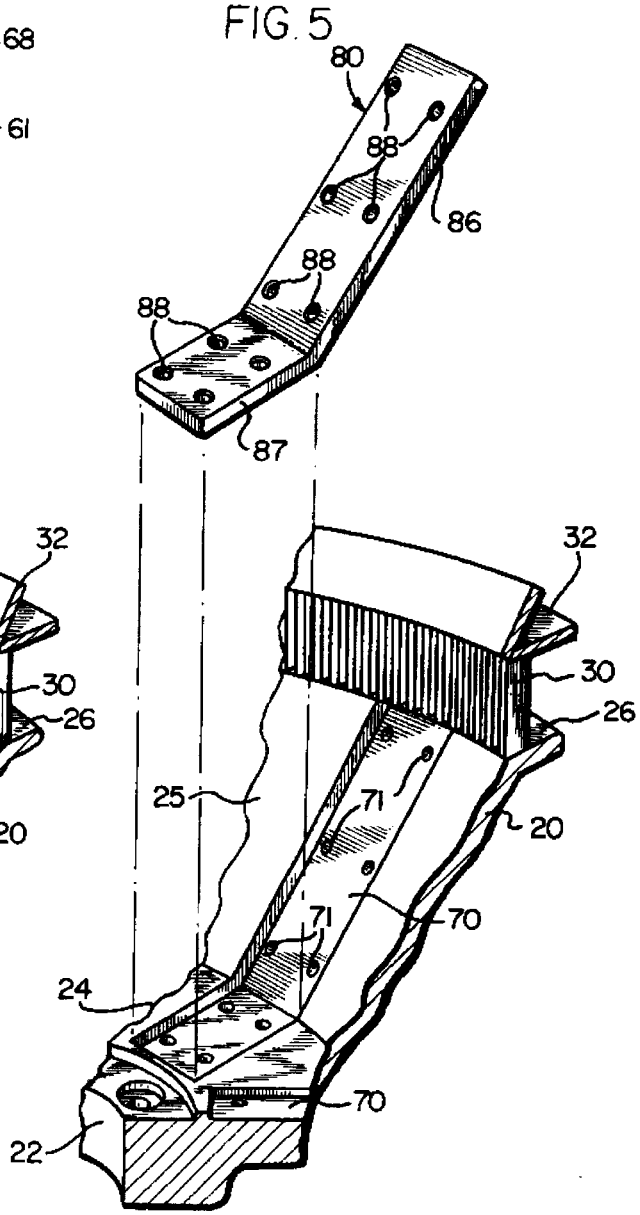
FIG. 5 shows a partial perspective view of a blank adapted to be inserted in a corresponding recess located in a separator bowl.

Blank 80, as seen in FIG. 5, comprises the same assembly as blade assembly 50 shown in FIG. 4 except blade 60 has been removed. Blank 80 comprises vertical blank portion 86 which corresponds to pad portion 66 and bottom blank portion 87 which corresponds with pad portion 67. Blank 80 has openings 88 which are adapted to be aligned with threaded openings 71 to receive threaded fasteners 72.

As seen in FIG. 3, four equally-spaced blade assemblies 50 have been installed in separator bowl 20 and four equally-spaced blanks 80 also have been installed.

Figure 8:
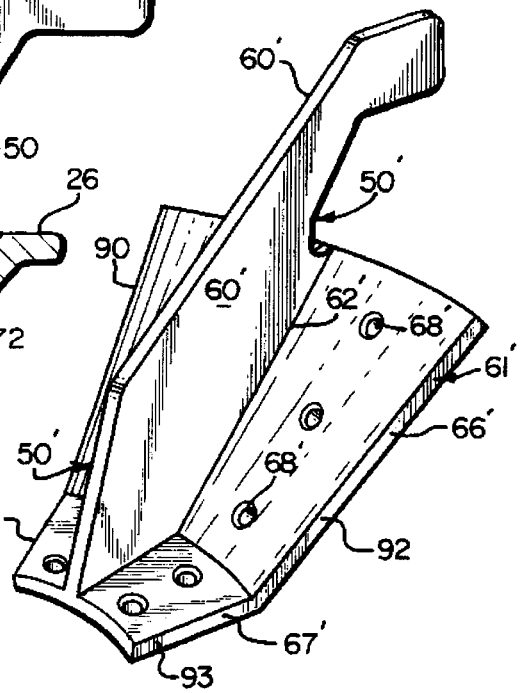
FIG. 8 shows a perspective view of one of the blade assemblies of FIG. 7.
Figure 7:
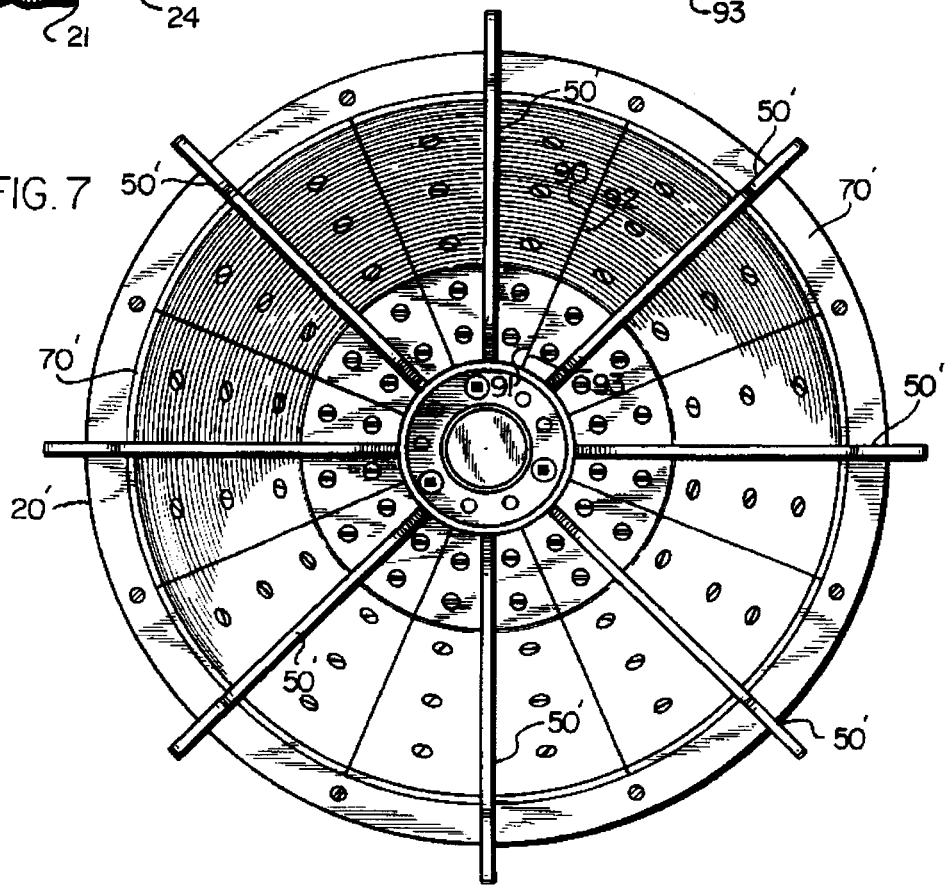
FIG. 7 shows another embodiment of the present invention in which pie-shaped pads of the blade assemblies cover substantially the entire internal area of the separator bowl which is recessed almost entirely along the internal vertical and bottom walls.
Figure 9:
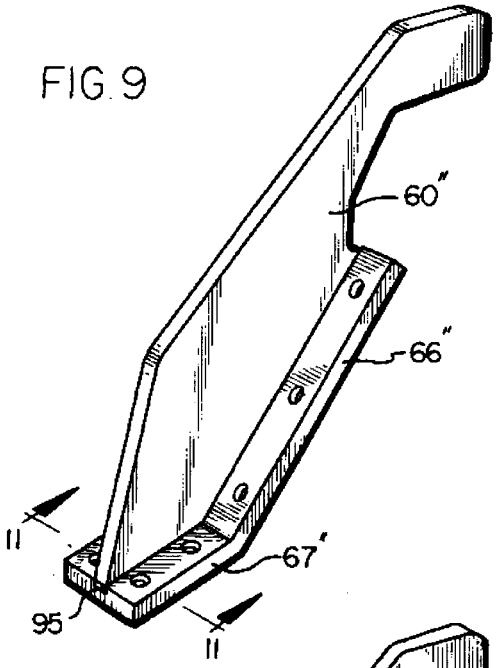
FIG. 9 shows a blade releasably disposed in a pad of a blade assembly.
Figure 11:
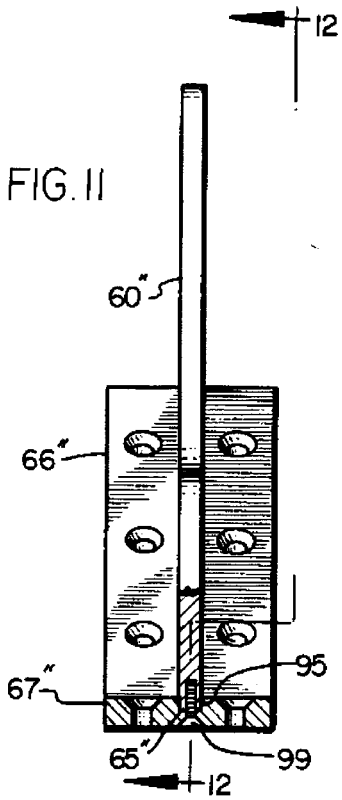
FIG. 11 is a section view taken along lines 11—11 in FIG. 9 and shows the blade fastened in the slotted pad.
Figure 10:
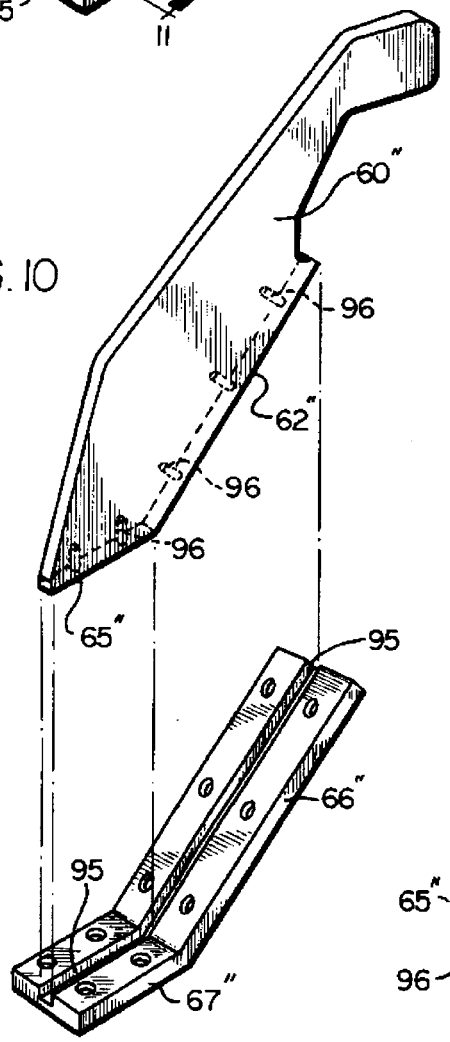
FIG. 10 shows a perspective view of the blade of FIG. 9 separated from a corresponding pad in the blade assembly.
Figure 12:
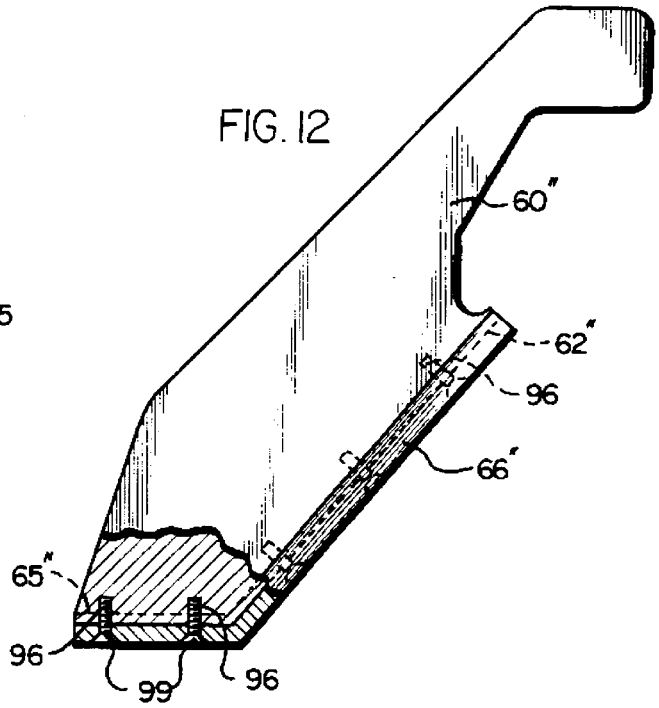
FIG. 12 is a section view taken along lines 12—12 in FIG. 11 and shows a partial section of the blade and pad fastened by threaded fasteners.

FIGS. 2 and 3 show recesses 70 spaced from one another, FIGS. 7 and 8 show another embodiment of a separator bowl in which recesses 70 are not spaced from each other, but rather one continuous recess 70' is disposed in bottom and vertical walls 24, 25 of separator bowl 20. This particular embodiment features eight blade assemblies 50'. Each blade assembly 50' is substantially the same as previously described for blade assembly 50 with the exception that the pie-shaped pad portions 66', 67' each have a greater width than corresponding pad portions 66, 67 shown in FIG. 4. Accordingly, in the illustration depicted in FIG. 7, each blade assembly 50' has a pad 61' which takes up one-eighth of the continuous recess area 70' in bowl 20'. As a result, when all eight blade assemblies 50' are installed, pad edges 90, 91 on one pad 61' will abut or be contiguous to pad edges 92, 93 on an adjacent pad 61'.

Preferably, blade assembly 50 or 50' is a one-piece cast iron or steel member with blade 60 or 60' being integral with the pad 61 and 61' respectively. If desired, however, blade 60 or 60' may be releasably secured to pad 61 or 61'. FIGS. 9–12 show pad base 67" and pad portion 66" having a slot 95 located on their respective inner pad walls. Blade 60" is adapted to fit in slot 95 along the outer blade edge 62" and bottom edge 65". Blade 60" has a plurality of threaded openings 96 along outer edge 62" which are adapted to align with openings 98 in pad 61". Threaded fasteners 99 serve to securely fasten blade 60" to pad 61".

Utilizing the blade and bowl assembly of the present invention allows for the replacement of one or more blade assemblies as required inasmuch as the location of the maximum wear will occur at the intersection of the outer blade edge and pad portions. Moreover, the fact that a single blade assembly 50 can be replaced as opposed to indexing a liner-blade assembly or replacing all the blade assemblies obviates the present need for indexing the liner-blade assembly. Moreover, the replacement of a blade assembly can be relatively easily achieved merely by raising a cone portion 46, 47 to permit maintenance personnel to reach threaded fasteners 72. The fasteners can be released and a blade assembly 50 and 50' withdrawn from open cone portion 46 or 47. Another blade assembly 50 or 50' can be inserted after which threaded fasteners 72 are replaced to maintain the blade assembly in position.

Similarly, the availability of the blade assembly and blanks of the present invention permits various combinations of blade assemblies to be utilized in a separator bowl depending upon the particular application.

While one or more embodiments of the invention have been herein illustrated and described in detail, it will be understood that modifications and variations thereof may be effected without departing from the spirit of the invention and the scope of the appended claims.

What is claimed is:

[1. A centrifuge device for separating a lubricating or other fluid from fluid impregnated metal shavings or the like comprising:

a separator bowl disposed within said centrifuge;

drive means for rotating said separator bowl within said centrifuge;

said bowl having a bowl wall having an inner wall surface and outer wall surface;

at least one recess disposed in said bowl wall on the inner wall surface;

at least one blade assembly comprising a pad and a blade extending outward from said pad;

said pad being releasably disposed within said recess;

whereupon said pad is adapted to be removed from said recess and another of said blade assemblies is adapted to be releasably disposed in said recess.]

2. [A centrifuge device in accordance with claim 1] *A centrifuge device for separating a lubricating or other fluid from fluid impregnated metal shavings or the like comprising:*

*a separator bowl disposed within said centrifuge;*

*drive means for rotating said separator bowl within said centrifuge;*

*said bowl having a bowl wall having an inner wall surface and outer wall surface;*

*at least one recess disposed in said bowl wall on the inner wall surface;*

*at least one blade assembly comprising a pad and a blade extending outward from said pad;*

*said pad being releasably disposed within said recess;*

*whereupon said pad is adapted to be removed from said recess and another of said blade assemblies is adapted to be releasably disposed in said recess; and,* wherein said bowl wall has a plurality of spaced recesses disposed on the inner wall surface; and, said blade assemblies are disposed within two or more of said recesses.

3. A centrifuge device in accordance with claim [1 or ] 2 and further including at least one blank means releasably disposed within one of said recesses.

4. A centrifuge device in accordance with claim 3 wherein said blank *means* includes a pad which has a structural configuration that corresponds to and is alignable with the structural configuration of a recess in said bowl and, said blank has a relatively smooth, inner surface, whereby when said blank is disposed within a recess in said bowl, said blank serves to fill in said recess and provide a relatively continuous extension of said inner wall surface of said bowl.

5. A centrifuge device in accordance with claim [2] *3* wherein said bowl has a plurality of blade assemblies and blank means alternately disposed in recesses disposed in said bowl.

6. A centrifuge device in accordance with claim 5 wherein said blade assemblies are releasably disposed in said recesses by means of fasteners.

7. A centrifuge device in accordance with claim 3 wherein a plurality of said recesses are equally spaced from one another in said bowl.

8. A centrifuge device in accordance with claim 7 wherein a blade assembly is releasably disposed in each recess in said bowl.

9. A centrifuge device in accordance with claim 7 wherein a plurality of blade assemblies and blanks are alternatively, releasably disposed in said recesses in said bowl.

10. A centrifuge device in accordance with claim 8 or 9 wherein each blade assembly comprises a one-piece member in which said blade and pad are integral.

11. A centrifuge device in accordance with claim 10 wherein each blade assembly is cast.

12. A centrifuge device in accordance with claim 8 or 9 wherein each blade is releasably attached to said pad.

13. A centrifuge device in accordance with claim [1] *2* wherein *each of* said blade assembly [pad] *pads* and [blade comprises] *blades comprise* an integral one-piece unit.

14. [A centrifuge device in accordance with claim 1] *A centrifuge device for separating a lubricating or other fluid from fluid impregnated metal shavings or the like comprising:*

*a separator bowl disposed within said centrifuge;*

*drive means for rotating said separator bowl within said centrifuge;*

*said bowl having a bowl wall having an inner wall surface and outer wall surface;*

*at least one recess disposed in said bowl wall on the inner wall surface;*

*at least one blade assembly comprising a pad and a blade extending outward from said pad;*

*said pad being releasably disposed within said recess;*

*whereupon said pad is adapted to be removed from said recess and another of said blade assemblies is adapted to be releasably disposed in said recess; and,* wherein said blade assembly pad comprises a first pad portion and a second pad portion which is integral with and angled away from said first pad portion.

15. A centrifuge device in accordance with claim 14 wherein said blade is integral with said first and second pad portions.

16. [A centrifuge device in accordance with claim 1] *A centrifuge device for separating a lubricating or other fluid from fluid impregnated metal shavings or the like comprising:*

*a separator bowl disposed within said centrifuge;*

*drive means for rotating said separator bowl within said centrifuge;*

*said bowl having a bowl wall having an inner wall surface and outer wall surface;*

*at least one recess disposed in said bowl wall on the inner wall surface;*

*at least one blade assembly comprising a pad and a blade extending outward from said pad;*

*said pad being releasably disposed within said recess;*

*whereupon said pad is adapted to be removed from said recess and another of said blade assemblies is adapted to be releasably disposed in said recess; and,* wherein said blade is releasably connected to said pad.

17. [A centrifuge device in accordance with claim 1] *A centrifuge device for separating a lubricating or other fluid from fluid impregnated metal shavings or the like comprising:*

*a separator bowl disposed within said centrifuge;*

*drive means for rotating said separator bowl within said centrifuge;*

*said bowl having a bowl wall having an inner wall surface and outer wall surface;*

*at least one recess disposed in said bowl wall on the inner wall surface;*

*at least one blade assembly comprising a pad and a blade extending outward from said pad;*

*said pad being releasably disposed within said recess;*

*whereupon said pad is adapted to be removed from said recess and another of said blade assemblies is adapted to be releasably disposed in said recess; and,* wherein said bowl is a cast one-piece member having a plurality of recesses disposed in the inner wall of said bowl.

[18. A rotatable separator bowl and blade assembly for use with a centrifugal separator device wherein said bowl comprises a wall-shaped member having an inner wall surface and an outer wall surface spaced from said inner wall surface;

at least one recess disposed on said wall on said inner wall surface;

a blade assembly adapted to be releasably disposed within said recess, said blade assembly including a pad having a structural configuration which corresponds with the structural configuration in said recess; and a blade connected to and extending out from said pad.]

19. A bowl and blade assembly in accordance with claim [18] *26* wherein said blade is integrally connected to said pad to form a one-piece member.

20. A bowl and blade assembly in accordance with claim 19 wherein said blade and pad are cast iron or steel.

21. [A bowl and blade assembly in accordance with claim 18] *A rotatable separator bowl and blade assembly for use with a centrifugal separator device wherein said bowl comprises a wall-shaped member having an inner wall surface and an outer wall surface spaced from said inner wall surface;*

*at least one recess disposed on said wall on said inner wall surface;*

*a blade assembly adapted to be releasably disposed within said recess, said blade assembly including a pad having a structural configuration which corresponds with the structural configuration in said recess;*

*a blade connected to and extending out from said pad; and,* wherein said blade is releasably connected to said pad.

22. [A bowl and blade assembly in accordance with claim 18] *A rotatable separator bowl and blade assembly for use with a centrifugal separator device wherein said bowl comprises a wall-shaped member having an inner wall surface and an outer wall surface spaced from said inner wall surface;*

*at least one recess disposed on said wall on said inner wall surface;*

*a blade assembly adapted to be releasably disposed within said recess, said blade assembly including a pad having a structural configuration which corresponds with the structural configuration in said recess;*

*a blade connected to and extending out from said pad; and,* wherein said bowl wall member includes a bottom wall and an outwardly and upwardly extending wall;

said bottom and outwardly and upwardly extending walls have a recess on the inner wall surfaces thereof; and, said blade assembly pad includes a pad portion having a structural configuration which corresponds to the structural configuration of said recess in said bottom wall; and, a second pad portion having a structural configuration corresponding to the structural configuration of said recess in said outwardly and upwardly extending wall.

23. A blade and bowl assembly in accordance with claim 22 wherein said blade is attached to said bottom wall pad portion and said outwardly and upwardly extending wall pad portion.

[24. A rotatable separator bowl in accordance with claim 18 wherein said recess is continuous in said bowl and a plurality of said blade assemblies are disposed in said recess.]

25. [A rotatable separator bowl in accordance with claim 24] *A rotatable separator bowl and blade assembly for use with a centrifugal separator device wherein said bowl comprises a wall-shaped member having an inner wall surface and an outer wall surface spaced from said inner wall surface;*

*at least one recess disposed on said wall on said inner wall surface;*

*a blade assembly adapted to be releasably disposed within said recess, said blade assembly including a pad having a structural configuration which corresponds with the structural configuration in said recess;*

*a blade connected to and extending out from said pad;*

*wherein said recess is continuous in said bowl and a plurality of said blade assemblies are disposed in said recess; and,* wherein a plurality of blade assemblies and a plurality of blank means are disposed in said recess.

26. [A rotatable separator bowl in accordance with claim 24] *A rotatable separator bowl and blade assembly for use with a centrifugal separator device wherein said bowl comprises a wall-shaped member having an inner wall surface and an outer wall surface spaced from said inner wall surface;*

*at least one recess disposed on said wall on said inner wall surface;*

*a blade assembly adapted to be releasably disposed within said recess, said blade assembly including a pad having a structural configuration which corresponds with the structural configuration in said recess;*

*a blade connected to and extending out from said pad;*

*wherein said recess is continuous in said bowl and a plurality of said blade assemblies are disposed in said recess; and,* in which the pad of each blade assembly is contiguous to the pad of adjacent blade assemblies.

[27. A blade assembly for use in a separator bowl in a separator device in which said bowl has a wall and at least one recess disposed on the inner surface of said wall; said assembly comprising:

a pad having a structural configuration corresponding to and alignable with the structural configuration of said recess; and a blade connected to and extending outwardly from said pad.]

28. A blade assembly in accordance with claim [27] *31* which said pad and blade form an integral one-piece member.

29. [A blade assembly in accordance with claim 27] *A blade assembly for use in a separator bowl in a separator device in which said bowl has a wall and at least one recess disposed on the inner surface of said wall; said assembly comprising:*

*a pad having a structural configuration corresponding to and alignable with the structural configuration of said recess;*

*a blade connected to and extending outwardly from said pad; and,* in which said blade is releasably connected to said pad.

30. A blade assembly in accordance with claim [27] *31* in which said blade and pad are cast as a one-piece unit.

31. [A blade assembly in accordance with claim 27] *A blade assembly for use in a separator bowl in a separator device in which said bowl has a wall and at least one recess disposed on the inner surface of said wall; said assembly comprising:*

*a pad having a structural configuration corresponding to and alignable with the structural configuration of said recess;*

*a blade connected to and extending outwardly from said pad; and,* in which said pad comprises a bottom portion and an outwardly and upwardly extending portion and said blade is attached to both said pad portions.

*32. A centrifuge device in accordance with claim 2 and further including fastening means for independently, releasably fastening each of said blade assemblies in one of said recesses.*

*33. A centrifuge device in accordance with claim 3 and further including means for independently, releasably fastening said blank means in one of said recesses.*

*34. A centrifuge device in accordance with claim 2 wherein a plurality of said recesses are equally spaced from one another in said bowl.*

*35. A centrifuge device in accordance with claim 34 where one of said blade assemblies is releasably disposed in each recess in said bowl.*

*36. A centrifuge device in accordance with claim 35 and further including fastening means for independently, releasably fastening each of said blade assemblies in one of said recesses.*

*37. A centrifuge device for separating a lubricating or other fluid from fluid impregnated metal shavings or the like comprising:*

*a separator bowl disposed within said centrifuge device;*

*drive means for rotating said separator bowl within said centrifuge device;*

*said bowl having a bowl wall having an inner wall surface and outer wall surface;*

*at least two discontinuous recesses disposed in said bowl wall;*

*at least one blade assembly comprising a pad and a blade extending outward from said pad;*

*said pad being releasably disposed within one of said recesses and having the structural configuration of said recess whereby said pad seats in said recess; and,*

*fastening means for independently, releasably mounting said blade assembly in said recess;*

*whereupon said pad is adapted to be removed from said recess and another of said blade assemblies is adapted to be releasably disposed in said recess.*

*38. A centrifugal device in accordance with claim 37 where one of said blade assemblies is releasably disposed in each of said recesses;*

*each of said blade assemblies includes a pad and a blade extending from said pad, said pad having the structural configuration of the recess in which said pad is seated; and,*

*fastening means for independently, releasably fastening each of said blade assemblies in one of said recesses.*

*39. A centrifugal separator device in accordance with claims 37 or 38 wherein said pad of said blade assembly has at least one opening; and,*

*said fastening means extends through said pad opening into said bowl wall to releasably and independently fasten a blade assembly in said recess.*

*40. A centrifugal separator device in accordance with claim 38 and further including at least one blank means releasably disposed in one of said recesses.*

*41. A centrifugal separator device in accordance with claim 40 and further including a plurality of blade assemblies and blank means;*

*each blade assembly and each blank means being seated in one of said recesses; and,*

*fastening means for independently releasably mounting each of said blade assemblies and blank means in said recesses.*

*42. A centrifuge device for separating a lubricating or other fluid from fluid impregnated metal shavings or the like comprising:*

*a separator bowl disposed within said centrifuge device;*

*drive means for rotating said separator bowl within said centrifuge device;*

*said bowl having a bowl wall having a bottom wall surface and an outward wall surface extending outwardly and upwardly from said bottom wall surface;*

*a continuous recess on the inner wall surface of said bowl wall;*

*a plurality of blade assemblies disposed in said recess;*

*each blade assembly comprising a pad having a first edge and a second edge and a blade extending outward from said pad;*

*each pad being positioned in said recess relative to an adjacent pad whereby a first edge of one pad is contiguous to a second edge of an adjacent pad and said second edge of said one pad is contiguous to a first edge of an adjacent pad;*

*fastening means for releasably mounting each of said blade assemblies to said bowl wall.*

*43. A centrifugal device in accordance with claim 42 wherein said bowl wall has a bottom wall surface and an outwardly and upwardly extending surface; and,*

*said pads of said blade assemblies at least cover substantially said bottom wall surface and are exposed to contact with metal shavings adapted to enter said centrifuge device.*

*44. A centrifugal device in accordance with claim 43 wherein said pads of said blade assemblies cover a substantial portion of both said bottom and outward wall surfaces and are exposed to contact with metal shavings adapted to enter said centrifuge device.*

*45. A centrifugal device in accordance with claims 43 or 44 wherein each of said pads has an opening therein; and said fastening means extends through said pad opening and releasably, fastens a blade assembly in said recess.*

*46. A centrifugal device in accordance with claim 45 and further including one or more blank means disposed within said recess.*

*47. A rotatable separator bowl in accordance with claim 26 and further including means for releasably fastening each of said blade assemblies in said continuous recess.*

*48. A rotatable separator bowl in accordance with claim 26 and further including a plurality of blank means disposed in said recess; and,*

*fastening means for independently, releasably fastening each of said blank means to said bowl.*

*49. A rotatable separator bowl in accordance with claim 48 wherein said blade assemblies and said blank means are alternately, releasably disposed in said recess.*

*50. A blade assembly in accordance with claim 47 wherein said blade assembly pad has at least one opening in the pad and said fastening means is adapted to enter said opening and releasably fasten said assembly to said bowl.*

*51. A rotatable separator bowl and blade assembly for use with a centrifugal separator device in which metal shavings are to be separated from lubricating or other fluids,*

*said bowl comprises a wall-shaped member which includes a bottom wall and an outwardly and upwardly extending wall having a recess in said bowl;*

*a plurality of blade assemblies adapted to be releasably disposed within said recess;*

*a blade assemblies each comprising a pad and a blade extending from said pad;*

*said pad having first and second edges and a structural configuration which corresponds with the structural configuration in said recess;*

*a first edge of one pad being contiguous to a second edge of an adjacent pad and the second edge of said one pad being contiguous to a first edge of an adjacent pad whereby, when said blade assemblies are seated in said bowl, said pads of said blade assemblies cover substantially all of at least said bottom bowl wall.*

*52. A rotatable separator bowl and blade assembly in accordance with claim 51 wherein said pad includes a first portion which is adapted to seat on said bottom bowl wall and a second portion which is adapted to seat on said outwardly and upwardly bowl wall.*

*53. A rotatable bowl and blade assembly in accordance with claim 51 and further including fastening means for releasably, independently fastening each of said blade assemblies to said bowl whereby one blade assembly may be removed independently of removing a fastening means for another blade assembly.*

*54. A rotatable bowl and blade assembly in accordance with claim 53 and further including fastening means which*

*extend through said pad of said blade assembly for fastening said blade assembly in said recess.*

*55. A rotatable bowl and blade assembly in accordance with claim 51 wherein said blade assembly pads disposed in said recess are unobstructed from exposure to contact to shavings adapted to enter said separator device.*

*56. A rotatable bowl and blade assembly in accordance with claim 51 and further including fastening means which extend through said pad of said blade assembly for fastening said pad in said recess; and,*

*said fastening means fasten both said first and second pad portions to said bowl wall.*

*57. A rotatable bowl and blade assembly in accordance with claim 56 in which said fastener means comprises a threaded fastener which is adapted to pass through such pad opening and into said bowl wall.*

*58. A centrifuge device for separating a lubricating or other fluid from fluid impregnated metal shavings or the like comprising:*

*a separator bowl disposed within said centrifuge;*

*drive means for rotating said separator bowl within said centrifuge;*

*said bowl having a bowl wall having a bottom wall surface and an outward wall surface extending outwardly and upwardly from said bottom wall surface;*

*a continuous recess on the inner wall surface of said bowl wall;*

*a plurality of blade assemblies disposed in said recess;*

*each blade assembly comprising a pad and a blade extending outward from said pad;*

*fastening means for releasably, independently mounting each of said blade assemblies whereby one blade assembly may be releasably mounted in said continuous recess independent of releasing a fastening means for another of said blade assemblies.*

* * * * *

UNITED STATES PATENT AND TRADEMARK OFFICE

CERTIFICATE OF CORRECTION

PATENT NO. : Re. 35,307

DATED : July 30, 1996

INVENTOR(S) : William D. Nemedi

It is certified that error appears in the above-identified patent and that said Letters Patent is hereby corrected as shown below:

In the Claims:

Column 10, line 18, following *31* insert --in--; and

Column 12, line 43, delete first occurrence of the word "a" and insert --said-- therefor.

Signed and Sealed this

Seventh Day of January, 1997

*Attest:*

BRUCE LEHMAN

*Attesting Officer*

*Commissioner of Patents and Trademarks*